(12) United States Patent
Vazquez et al.

(10) Patent No.: US 8,894,106 B2
(45) Date of Patent: Nov. 25, 2014

(54) VEHICLE LATCH

(75) Inventors: Francisco Javier Vazquez, CD. Juárez Chih (MX); Eduardo Estrada De Leon, Ciudad Juarez Chih (MX); Claudia Paola Ortiz, CD Juárez Chih (MX)

(73) Assignee: Inteva Products, LLC, Troy, MI (US)

( * ) Notice: Subject to any disclaimer, the term of this patent is extended or adjusted under 35 U.S.C. 154(b) by 151 days.

(21) Appl. No.: 13/475,157

(22) Filed: May 18, 2012

(65) Prior Publication Data

US 2012/0292927 A1 Nov. 22, 2012

Related U.S. Application Data

(60) Provisional application No. 61/487,958, filed on May 19, 2011.

(51) Int. Cl.
*E05C 3/06* (2006.01)
*B23P 11/00* (2006.01)
*E05C 3/16* (2006.01)

(52) U.S. Cl.
CPC . *B23P 11/00* (2013.01); *E05C 3/16* (2013.01); *Y10S 292/23* (2013.01)
USPC ............... 292/216; 292/201; 292/DIG. 23

(58) Field of Classification Search
USPC ............... 292/200, 201, 216, DIG. 23
See application file for complete search history.

(56) References Cited

U.S. PATENT DOCUMENTS

| 5,769,468 | A | * | 6/1998 | Armbruster | 292/201 |
| 5,785,364 | A | * | 7/1998 | Kleefeldt et al. | 292/201 |
| 5,897,148 | A | * | 4/1999 | Arabia et al. | 292/216 |
| 6,048,002 | A | * | 4/2000 | Ohta et al. | 292/201 |
| 2008/0136196 | A1 | * | 6/2008 | Pecoul et al. | 292/215 |
| 2008/0296913 | A2 | * | 12/2008 | Deblock | 292/196 |

* cited by examiner

*Primary Examiner* — Kristina Fulton
*Assistant Examiner* — Christine M Mills
(74) *Attorney, Agent, or Firm* — Cantor Colburn LLP (57) ABSTRACT

A latch is provided, the latch having: a fork bolt that moves between an unlatched position and a latched position; a first detent lever that that cooperates with the fork bolt and moves between an engaged position and a disengaged position; a hold open lever for biasing against the first detent lever when the first detent lever is in the released position; and a single switch that is activated only when the first detent lever is moved from the engaged position towards the disengaged position and when the fork bolt moves from the unlatched position towards the latched position, wherein the latch does not have any other switches.

20 Claims, 12 Drawing Sheets

VEHICLE LATCH

CROSS REFERENCE TO RELATED APPLICATIONS

This application claims the benefit of U.S. Provisional Patent Application No. 61/487,958 filed May 19, 2011, the contents of which are incorporated herein by reference thereto.

TECHNICAL FIELD

Exemplary embodiments of the present invention relate to a vehicle latch and more particularly a latch that can provide information on the status of a fork bolt and a detent lever of the latch.

BACKGROUND OF THE INVENTION

A vehicle frequently includes displaceable panels such as doors, hood, trunk lid, hatch and the like which are affixed for hinged or sliding engagement with a host vehicle body. Cooperating systems of latches and strikers are typically provided to ensure that such panels remain secured in their fully closed position when the panel is closed.

A door latch typically includes a fork bolt that is pivoted between an unlatched position and a primary latched position when the door is closed to latch the door in the closed position. The fork bolt is typically held in the primary latched position by a detent lever that pivots between an engaged position and a disengaged position. The detent lever is spring biased into the engaged position and thus, holds the fork bolt in the primary latched position when in the engaged position and releases the fork bolt when it is moved to the disengaged position so that the door can be opened.

The fork bolt is pivoted to the primary latched position by a striker attached to, for example, an associated door jamb when the door is closed. Once in the primary latched position, the detent lever engages the fork bolt to ensure the assembly remains latched.

Some vehicles have power unlatching mechanisms that electrically release the door latch. These power unlatching mechanisms moves the detent lever from the engaged position to the disengaged position such that the fork bolt can be rotated or pivoted to the unlatched position. However and when an external condition or force is applied to the door the door may not "pop open" freely and if the power unlatching mechanism is subsequently disengaged the detent lever returns to the engaged position by the spring biasing force and the door cannot be opened even though an electric release command was provided.

Latches mounted in the rear of the vehicle that need to be FMVSS compliant with Federal Motor Vehicle Safety Standards (FMVSS) usually use one switch that signals when the fork bolt is in a position other than the primary latched position. This type of latch typically uses a hold open or snow lever that keeps the detent in the released position when the latch is power released but there is an external load keeping the door closed. This condition can cause a latch to be in a primary position but the detent lever would be in the released position. Hence the door would be closed but the latch would not be latched.

In order to avoid the above described condition some latch manufactures add a switch on the detent that signals when the detent lever is in the released position. If only this detent switch is added and not the fork bolt switch then there is no way of knowing if the latch is in primary, secondary or open when the detent is being held open. Thus, typically two separate switches are employed to determine the state of the fork bolt and the detent lever.

Accordingly, it is desirable to provide an automatically operated door latch assembly. More specifically, it is desirable to provide an automatically operated door latch assembly that is able to provide the status of the fork bolt and the detent lever with a minimal amount of components.

SUMMARY OF THE INVENTION

In accordance with an exemplary embodiment of the invention, a latch is provided, the latch having: a fork bolt that moves between an unlatched position and a latched position; a first detent lever that that cooperates with the fork bolt and moves between an engaged position and a disengaged position; a hold open lever for biasing against the first detent lever when the first detent lever is in the released position; and a single switch that is activated only when the first detent lever is moved from the engaged position towards the disengaged position and when the fork bolt moves from the unlatched position towards the latched position, wherein the latch does not have any other switches.

In another exemplary embodiment, a latch is provided the latch having: a fork bolt that moves between an unlatched position and a latched position; a first detent lever that that cooperates with the fork bolt and moves between an engaged position and a disengaged position, wherein the first detent lever prevents the fork bolt from moving from the latched position to the unlatched position when the first detent lever is in the engaged position; a hold open lever configured for movement between a blocking position and an unblocking position, wherein the hold open lever maintains the first detent lever in the disengaged position when the hold open lever is in the blocking position and wherein the hold open lever is configured to allow the first detent lever to move into the engaged position when the hold open lever is in the unblocking position and wherein the hold open lever is configured to allow a feature of the fork bolt to pass through the hold open lever as the fork bolt moves from the latched position to the unlatched position and wherein the feature of the fork bolt contacts and moves the hold lever from the blocking position to the unblocking position as the fork bolt moves from the unlatched position to the latched position; and a single switch that is only activated by movement of the hold open lever.

In yet another embodiment, a method of determining a state of a latch is provided. The method including the steps of: movably mounting a fork bolt to the latch for movement between an unlatched position and a latched position; movably mounting a first detent lever to the latch for movement between an engaged position and a disengaged position, wherein the first detent lever prevents the fork bolt from moving from the latched position to the unlatched position when the first detent lever is in the engaged position; movably mounting a hold open lever to the latch for movement between a blocking position and an unblocking position, wherein the hold open lever maintains the first detent lever in the disengaged position when the hold open lever is in the blocking position and wherein the hold open lever is configured to allow the first detent lever to move into the engaged position when the hold open lever is in the unblocking position and wherein the hold open lever is configured to allow a feature of the fork bolt to pass through the hold open lever as the fork bolt moves from the latched position to the unlatched position and wherein the feature of the fork bolt contacts and moves the hold lever from the blocking position to the unblocking position as the fork bolt moves from the unlatched position to the latched position; and actuating only a single switch via movement of the hold open lever.

Additional features and advantages of the various aspects of exemplary embodiments of the present invention will become more readily apparent from the following detailed description in conjunction with the drawings wherein like reference numerals refer to corresponding parts in the several views.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

Exemplary embodiments of the present invention relate to an apparatus and method for providing a latch assembly. Furthermore, exemplary embodiments are directed to a latch assembly having a fork bolt movably secured thereto for movement between a latched position and an unlatched position. The latch assembly further comprises a detent lever capable of movement between an engaged position and a disengaged position, wherein the detent lever retains the fork bolt in the latched position when the detent lever is in the engaged position. The latch assembly further comprises a hold open lever for maintaining the detent lever in the disengaged position until the fork bolt is rotated into the unlatched position. Still further and in one embodiment, the latch assembly uses a single switch for providing a signal indicative of the position of the fork bolt as well as the detent lever.

References made to the following U.S. Pat. Nos. 3,969,789 and 6,568,741; U.S. Patent Publication Nos. 2002/0163207; 2011/0031765; and pending application Ser. No. 13/030,030 filed Feb. 17, 2011 the contents each of which are incorporated herein by reference thereto.

Certain passenger vehicles are equipped with a rear vehicle storage compartment, commonly known as a trunk. The trunk is closed by a deck lid that is hinged to the vehicle body and swings open to provide access to the storage compartment. Similarly, other vehicles are equipped with a lift gate that allows access to the rear of the vehicle through a gate that is hinged at or near the roof line of a vehicle and opens upward. Other vehicles have sliding doors that run horizontally on a track between an opened and closed position. Each of the deck lid, lift gate or sliding door can be thought of as panels that allow access to the interior of the vehicle compartment. Compartment latches, enable each of these types of panels to be secured and closed.

When it is desired to open these panels, it is known to use a remote unlatch mechanism that releases a detent lever from engagement with a fork bolt, allowing a striker pin to be removed from the catch (or throat) of the fork bolt. Advantageously, the deck lid, lift gate or sliding door will release from the striker pin and bias away from the striker due to shocks, springs, motors etc. incorporated in these panels. However, when the panel does not bias away, the remote unlatch mechanism that causes the detent lever to be released from engagement with the fork bolt is de-energized. As a result, the detent lever risks falling back into engagement with the fork bolt— and the panel cannot be opened. When the panel does not automatically bias open upon release of the detent lever from the fork bolt, it would be advantageous to maintain the detent lever in a released position until such time as the panel can be manually opened. Normally this is done with multiple additional parts which adds complexity and cost to a latch.

Various exemplary embodiments of the invention allow a detent lever of a latch to stay in a released position. This can be useful when a door or lid that is held closed by the latch is intended to be open, but does not act in the desired fashion due to a malfunction not associated with the latch.

Referring now to the FIGS. embodiments of the invention will be described with reference to specific embodiments, without limiting same, FIGS. 2-11 show a latch or latch assembly 10, with a cover 9 of the latch 10 illustrated in phantom to illustrating the inner workings of the latch 10. In the exemplary embodiment shown, latch 10 is a compartment latch.

A compartment latch 10 of the type shown is useful for the rear compartment, such as a trunk of a vehicle. The latch 10 can keep the trunk lid latched, can keep a lift gate of a vehicle latched or a sliding door of vehicle closed, such as a van door. However, the invention is applicable to any environment where the features of the invention are desired. For example, the latch assembly can be attached to a vehicle structure such that the fork bolt is moved between the open position and the closed position when a hood, door, window, lift gate, etc. is opened and closed and the fork bolt engages a striker that is attached to the hood, door, window, lift gate, etc.

Alternatively, the latch assembly can be secured to the hood, door, window, lift gate, etc. and the striker is secured to the vehicle body at an opening into which the hood, door, window, lift gate, etc. is received.

Latch 10, located on a first element, such as trunk lid (not shown) includes a fork bolt 11 and a detent lever 12 each being pivotally mounted to the latch 10. Fork bolt 11 is capable of rotation about first stud 14, while detent lever 12 is a capable of rotation about a second stud 15. A striker 16 is attached to a second element, such as the vehicle body and is adapted to engage the fork bolt 11 to cause latching of the trunk lid or first element to the vehicle body.

In accordance with an exemplary embodiment, the fork bolt is capable of movement in the direction of arrows "A" between a first or latched position (See at least FIGS. 2, 10 and 11) wherein a striker 16 is engaged by a throat of the fork bolt and a second or open position (See at least FIG. 8) wherein the striker is free to be released from the throat of the fork bolt. The housing of the latch will also have a complimentary opening for receipt of the striker therein when it is engaged or latched by the fork bolt. The fork bolt is spring biased into the second or open position.

In addition and in order to retain the latch assembly or fork bolt in the latched position, the detent lever is pivotally secured to the latch assembly for movement in the direction of arrows "B" between an engaged position (See at least FIGS. 2, 10 and 11) and a disengaged position (See at least FIGS. 3-9). When the detent lever is in the engaged position, a surface of the fork bolt is engaged by a surface of the detent lever and the fork bolt is prevented from moving toward the unlatched position from the latched position. In one implementation, a first spring 17 is provided for biasing the fork bolt into the open position while a second spring 19 is provided for biasing the detent lever in the direction of the engaged position, such that movement of the fork bolt to the latched position will cause the detent lever to move to the engaged position.

In accordance with exemplary embodiments of the present invention, the fork bolt has an engagement surface or contact surface that slides along and makes contact with a complimentary engagement surface or contact surface of the detent lever when the fork bolt pivots or moves from the open or unlatched position to the closed or latched position and once in the closed position a surface of the fork bolt engages a surface of the detent lever thus engaging the fork bolt and securing it into the closed position when the striker is secured in a receiving opening of the fork bolt. Once the latch is in the closed position the detent lever is spring biased into contact with the fork bolt such that the fork bolt cannot rotate into the open position unless the detent lever is moved back to the release or disengaged detent position.

In order to move the detent lever to the release or disengaged position a release mechanism coupled to the detent lever is configured to move the detent lever from the engaged position to the disengaged position upon actuation of the release mechanism.

Figure 1:
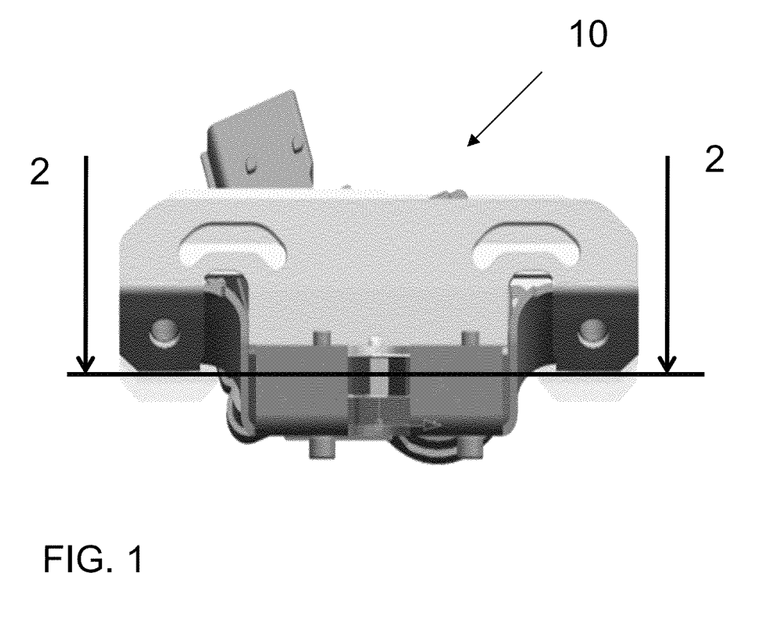
FIG. 1 is a view illustrating a latch assembly in accordance with an exemplary embodiment of the present invention.

When fork bolt 11 and detent lever 12 are in a latched and engaged position (See at least FIGS. 1, 10 and 11), a striker 16 is captured in a throat 22 of fork bolt 11. Here a shoulder portion 23 of detent lever 12 cooperates with a shoulder portion 24 of fork bolt 11 to retain latch 10 in the closed position.

Figure 3:
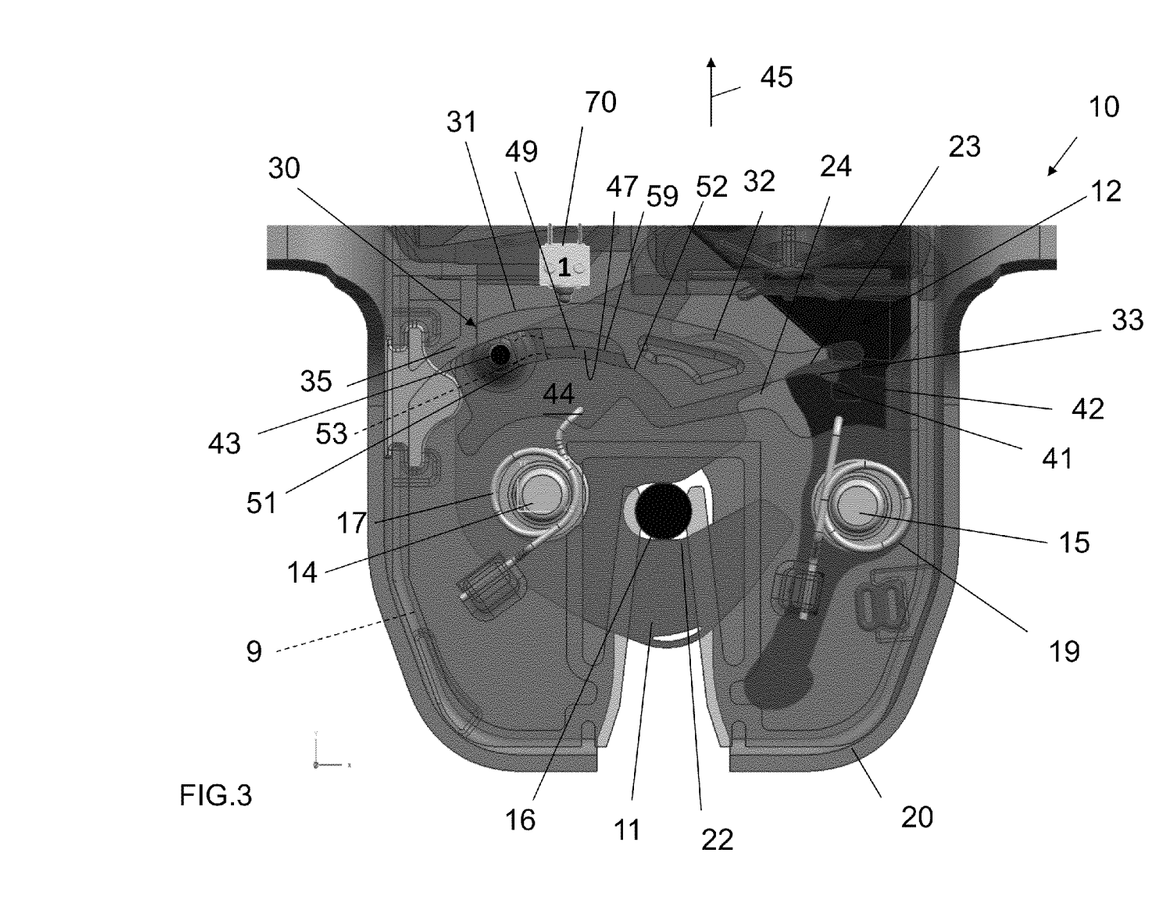
FIG. 3 is a view of the latch assembly wherein the detent lever has moved to the disengaged position.
Figure 4:
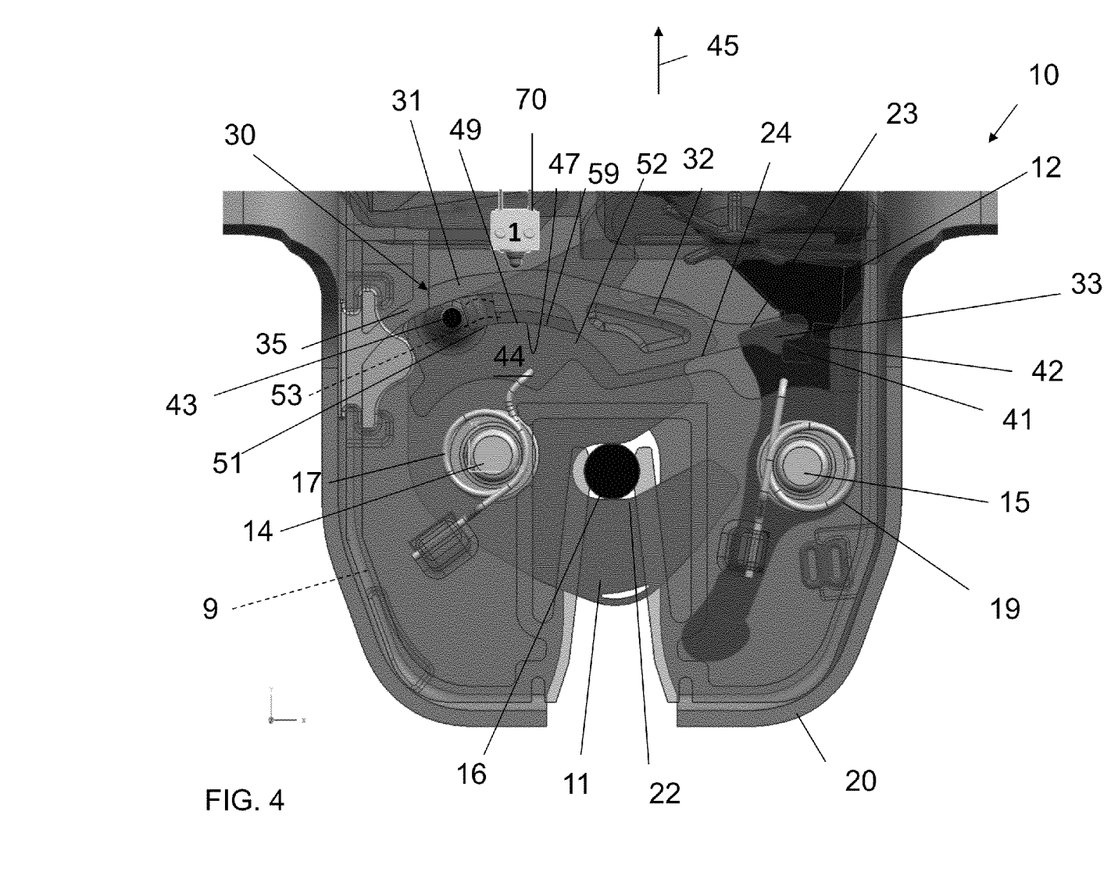
FIGS. 4-8 are views illustrating the fork bolt rotating from the primary or latched position to the unlatched position.
Figure 5:
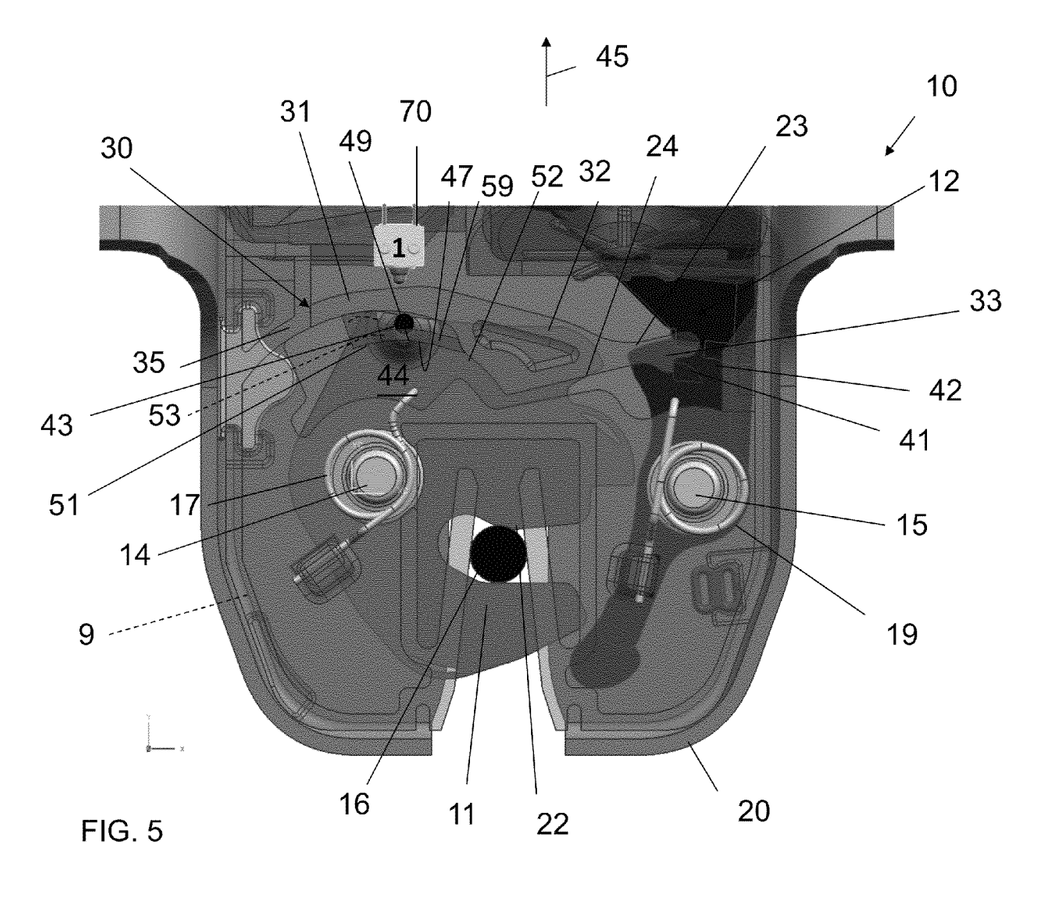

Referring now to at least FIG. 3, detent lever 12 has been rotated clockwise towards a released or disengaged position. In this position, shoulder portion 23 has been moved out of engagement with shoulder portion 24, allowing fork bolt to rotate clockwise, as shown in at least FIGS. 3-8. The fork bolt open position of FIG. 8 allows striker 16 slide out of throat 22 and further rotate the fork bolt in the clockwise direction until the striker is completely moved away from the latch or out of the latch assembly.

Figure 2:
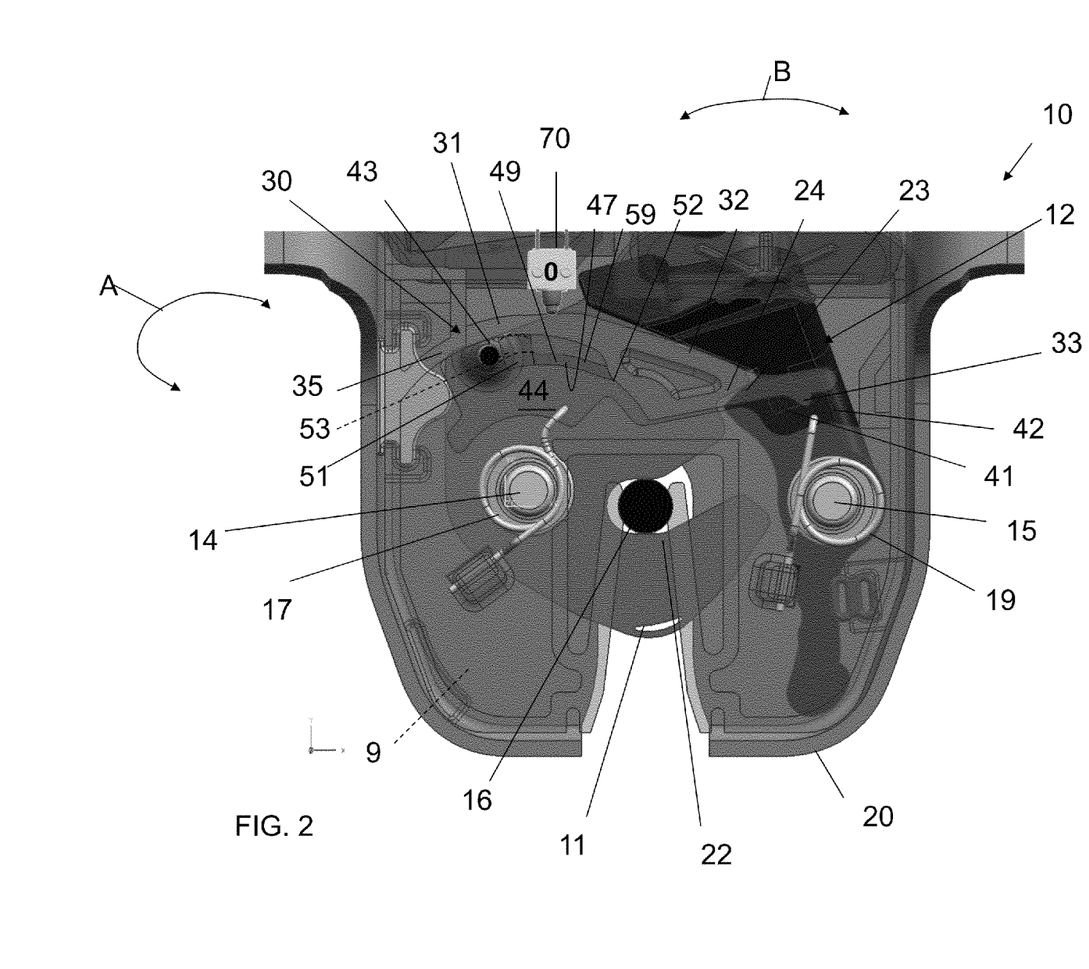
FIG. 2 is a view along lines 2-2 of FIG. 1 illustrating the latch assembly in a primary or latched position wherein the detent lever has moved to the engaged position.
Figure 8:
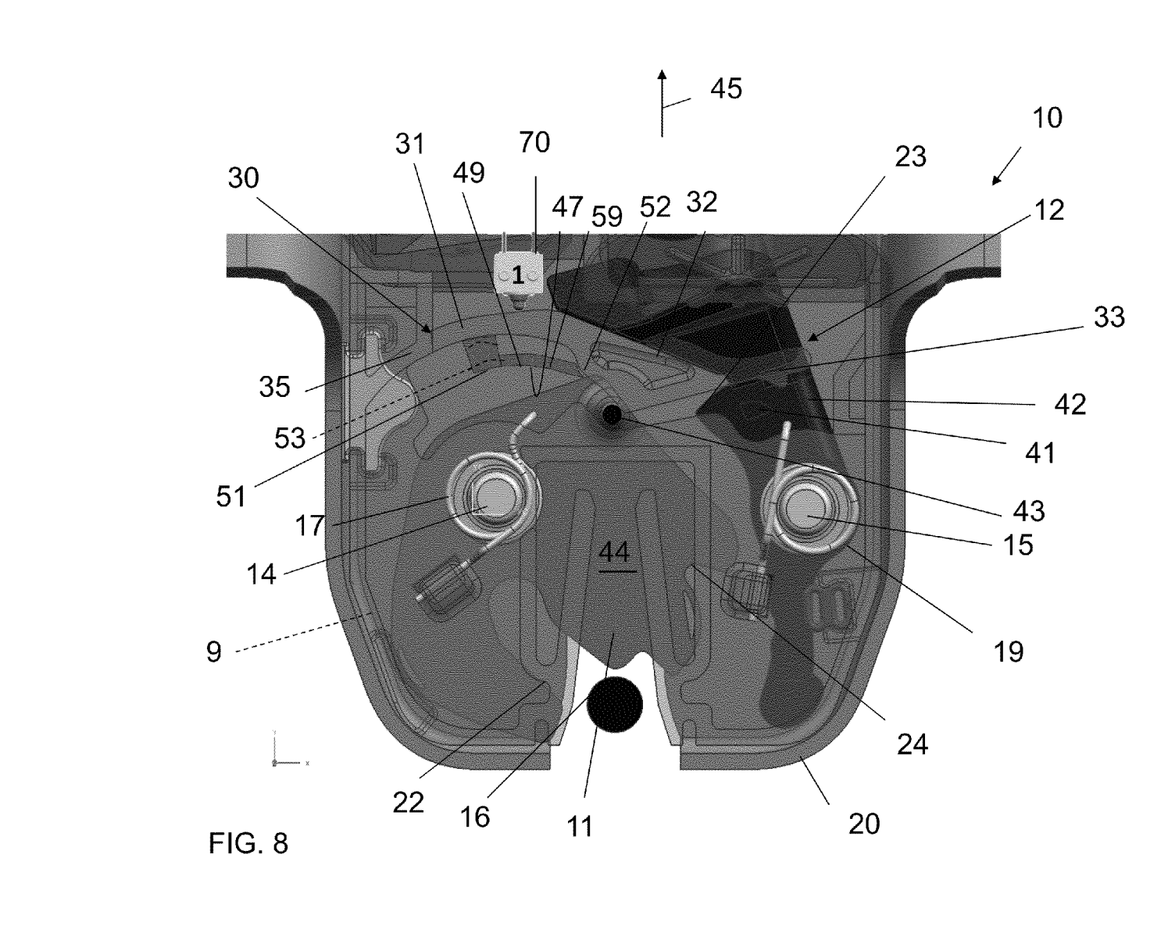
Figure 9:
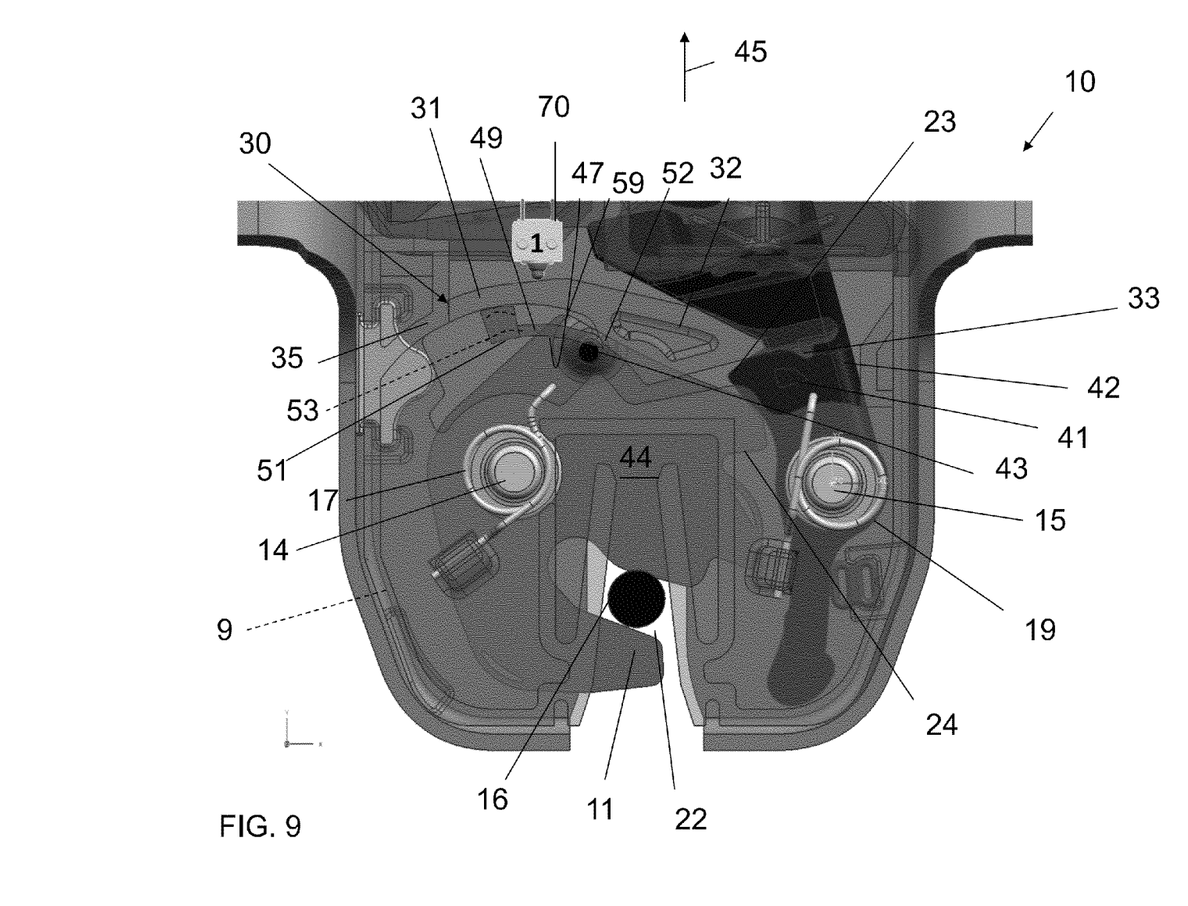
FIGS. 9-11 are views illustrating the fork bolt rotating from the open or unlatched position to the primary or latched position.
Figure 10:
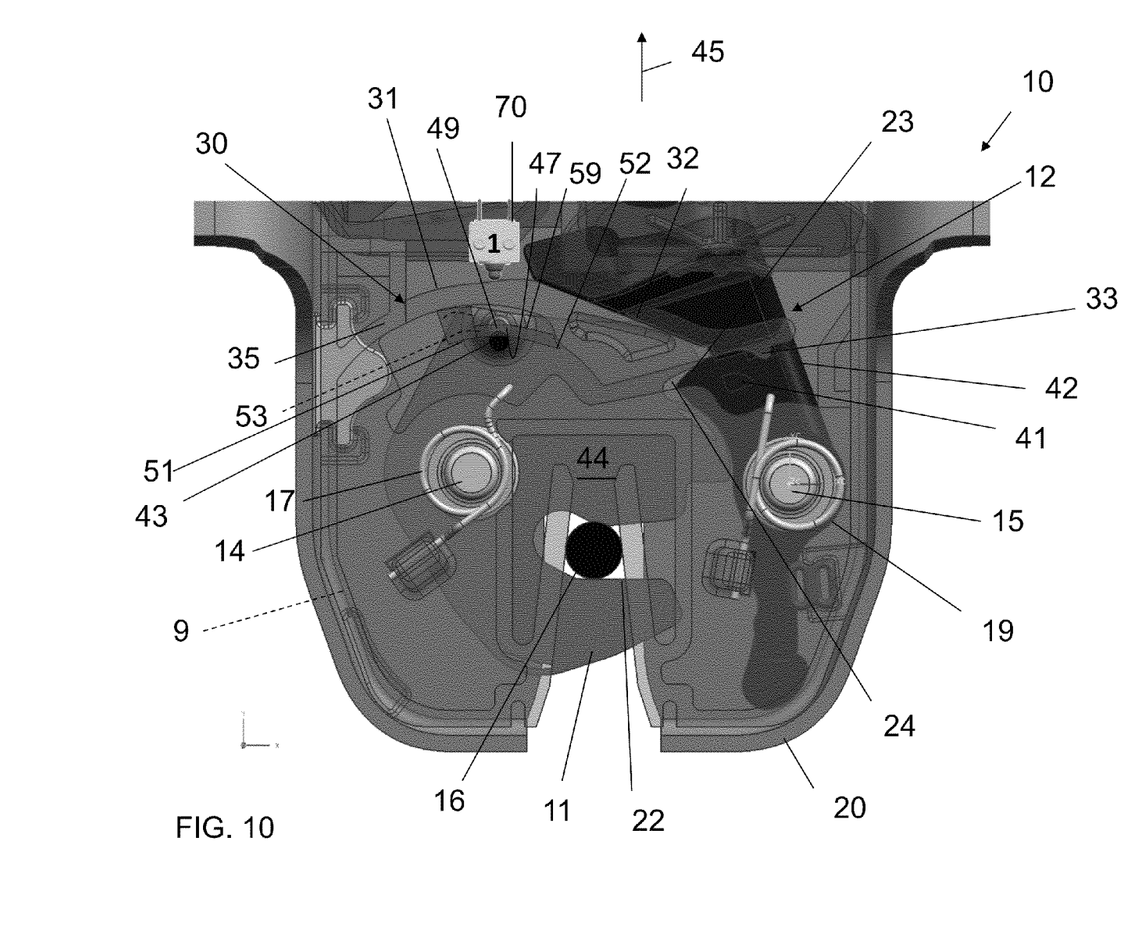
Figure 11:
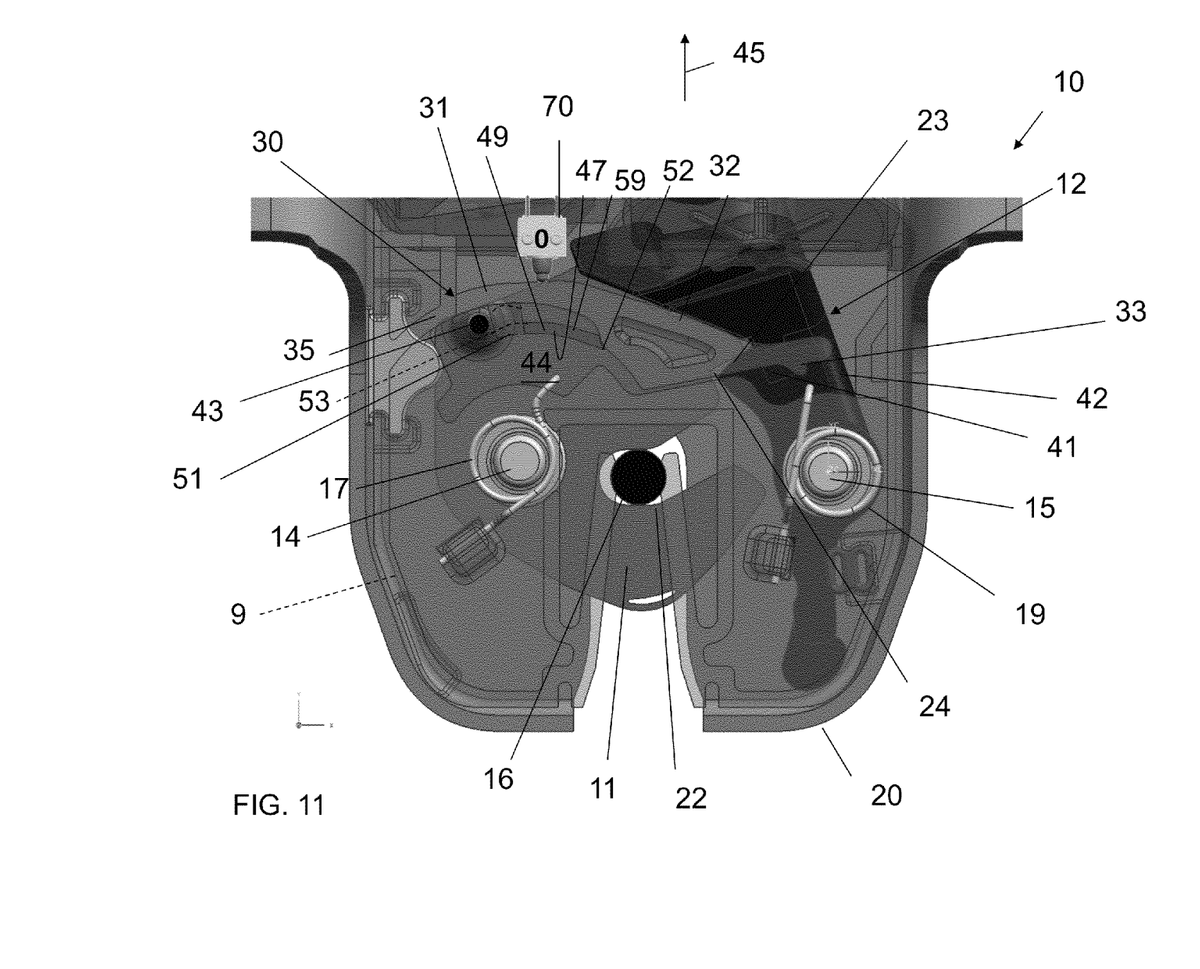

In operation, latch 10 is moved from the latched position of FIG. 2 to the unlatched position of FIG. 8 by initiating rotation of detent lever 12 in a clockwise rotation against the bias of spring 19. Rotation force can be initiated manually or by an automatic lock-unlock mechanism (not shown). Once the rotation force is released, the spring bias acting on detent lever 12 will cause detent lever to rotate in a counterclockwise movement until detent lever 12 again engages fork bolt 11.

Similarly and if the detent lever is in the disengaged position, a force from spring 17 will rotate the fork bolt into the unlatched or open position. If fork bolt 11 has not rotated to the open position shown in FIG. 8, shoulder portion 23 of detent lever 12 will again engage shoulder portion 24 of fork bolt 11, causing the latch and the fork bolt to remain in the latched position. This situation may occur when, for example, the pistons that cause trunk lid or lift gate to open do not function properly. In another example, a snow load placed on the trunk lid (or another weight) may prevent the trunk lid from opening when detent lever 12 is rotated out of the closed position. Thus, when the rotation force on detent lever 12 is released and striker 16 has not been removed from throat 22, detent lever 12 rotates back to the closed position. The trunk lid or other device used by latch 10, therefore, does not open as intended.

In the exemplary embodiment shown, cover 9 or alternatively a housing portion 20 is provided with an integrally formed housing arm, second detent lever or hold open lever 30 that includes a cantilever portion 31, a hold open arm portion 32 and a stop portion or feature 33 depending or extending from hold open arm portion 32. By integrally forming the housing arm or hold open lever with the cover or the housing this negates the need for a separate spring for the housing arm or hold open lever as well as an addition assembly operation each or which will save associated manufacturing costs.

In one exemplary embodiment, the housing portion and the housing arm is formed of a plastic or other equivalent easily molded material or equivalents thereof that is integrally molded with the cover or the housing for example at the same time the housing is formed. Alternatively, the housing arm may be inserted molded into the housing or still in another alternative fixed to the housing separately. Although exemplary embodiments are directed to a plastic housing and housing arm other equivalent materials are considered to be with the scope of various embodiments of the invention.

Detent lever 12 includes a hook or feature 41 raised in relief off of a front surface 42 of detent lever 12 so that it projects away from the surface 42 of the detent lever and is configured to releasably engage stop portion 33 of hold open lever 30, as will be described in detail hereinafter. In one non-limiting exemplary embodiment, feature 41 is formed from an encapsulation provided upon the detent lever for example, a thermoplastic elastomer or other equivalent material applied to the detent lever, which may be formed from steel, metal, plastic or any other suitable material.

In addition, fork bolt 11 includes a finger, pin or feature 43 extending from a front surface 44 of fork bolt 11 in a manner complementary to hook 41. In one non-limiting exemplary embodiment, feature 43 is also formed from an encapsulation provided upon the fork bolt for example, a thermoplastic elastomer or other equivalent material applied to the fork bolt, which may be formed from steel, metal, plastic or any other suitable material.

Referring again to FIG. 3 when detent lever 12 is rotated clockwise, hook or feature 41 moves past stop portion 33 by sliding along first complementary edges of each. In addition, hold open lever 30 will move upwardly in the direction of arrow 45. Hold open lever 30 or at least a living hinge portion 35 of hold open lever 30 connecting the same to a portion of the latch assembly will be formed out of a material having resilient characteristics such that a biasing force in a direction opposite to arrow 45 is provided. As hook or feature 41 moves in a clockwise direction (as represented in the drawing) from the engaged position to the disengaged position hold open lever 30 is moved upward in the direction of arrow 45 until feature or hook 41 moves past stop portion 33 the biasing force of the housing arm or the living hinge will move the same in a direction opposite to arrow 45 and stop portion 33 will now be in a position to contact hook or feature 41 as it tries to move in a counter clockwise direction from the disengaged position to the engaged position.

As discussed above, contact of hook portion or feature 41 with stop portion or feature 33 causes hold open lever 30 to rotate in a counterclockwise motion from a first rest position to a second biased position, about living hinge portion 35, until hook 41 moves past stop portion 33, as shown at least in FIG. 3. Thereafter, living hinge portion 35 biases housing portion 30 back to the first rest position. In this position, hook 41 engages stop portion, thus preventing detent lever 12 from biasing back counterclockwise to a closed or rest position. Since detent lever 12 is held in this released position by hold open lever 30, fork bolt 11 is free to rotate to the fork bolt open position, and release striker 16 from throat 22, shown in FIG. 8, whenever an external force is applied to the item the striker is secured to. Stop portion 33 acts as a secondary detent that holds primary detent lever 12 from returning to the closed or rest position.

Detent lever 12 will be maintained in released position of FIG. 3 until fork bolt 11 rotates clockwise to the open position shown in FIG. 8. Upon rotation of fork bolt 11 to the open position, finger 43 slides past an inside surface 47 of an integral arm 49 of the hold open lever 30 which is configured to allow feature 43 travel past arm 49 by biasing arm 49 into an open position (see at least FIG. 6) and travels outside of arm 49 such that arm 49 can spring back into a closed position (see at least FIG. 8).

Figure 6:
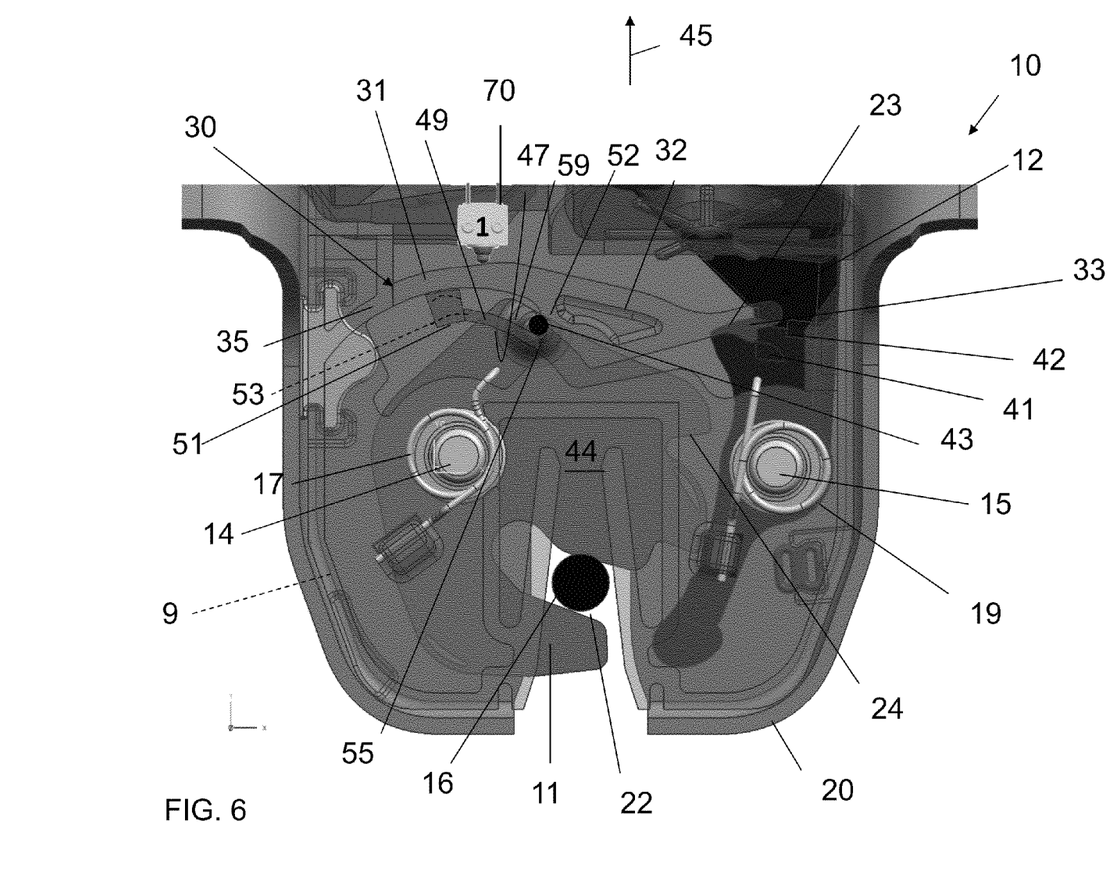
Figure 7:
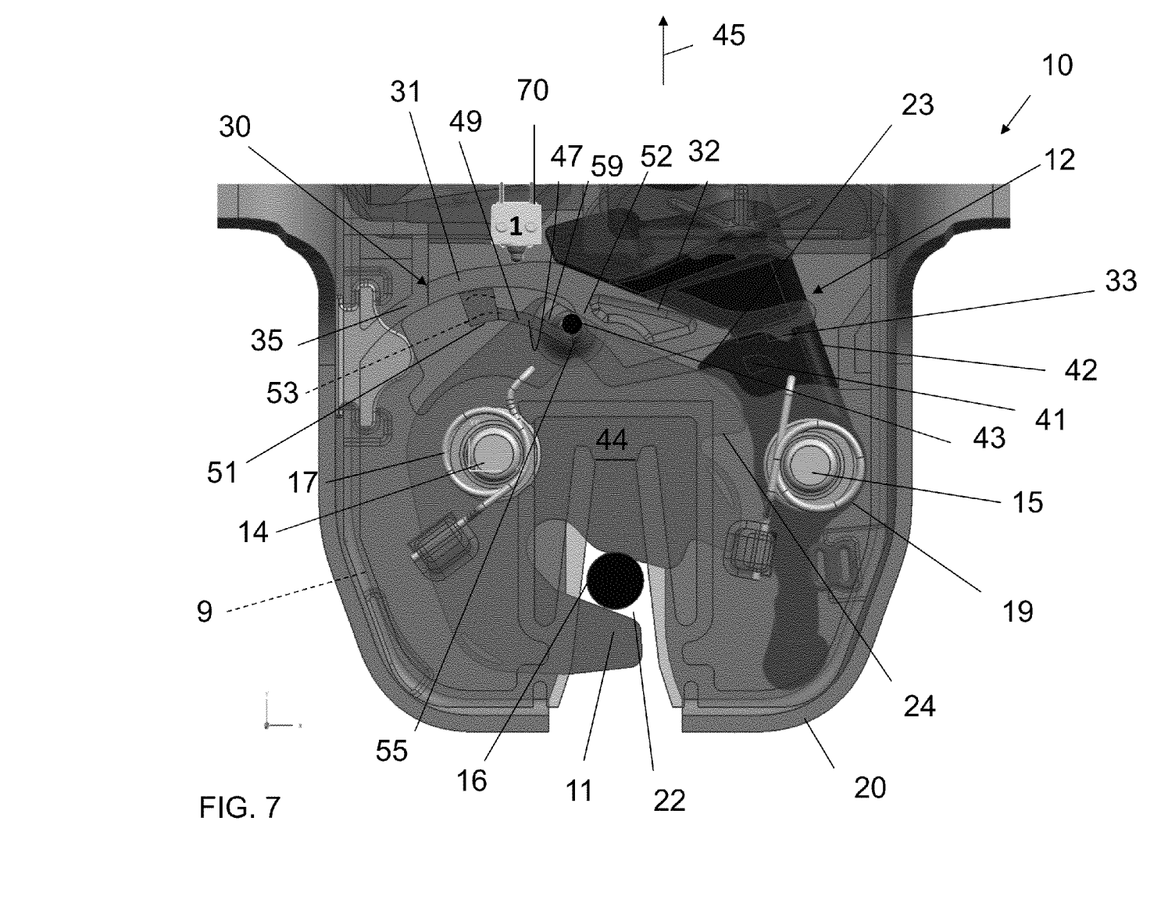

In one non-limiting exemplary embodiment, arm 49 is integrally formed with the hold open lever 30 and is formed out of the same materials as hold open lever 30 such that arm 49 is capable of being manipulated from the closed position of FIGS. 2-5 and 8-11 to the open position of FIG. 6 and thus is provided with an internal biasing force to return it to the closed position of FIGS. 2-5 and 8-11. In addition and as illustrated in the attached FIGS., arm 49 is coupled to hold open lever 30 by a living hinge portion 51. Living hinge portion 51 is configured such that pin 43 will be allowed to travel underneath living hinge portion by either passing through a channel 53 or simply travelling underneath living hinge portion 51. Thereafter, pin 43 travels along the inside surface 47 until pin 43 is located proximate to a distal end 55 of arm 49. Arm 49 is configured to extend further downwardly towards fork bolt 11 than living hinge portion 51 such that as the fork bolt 11 rotates to the open position pin 43 will travel under portion 51 and contact a distal end 55 of arm 49 such that further movement of the fork bolt to the open position will cause arm 49 to the rotated into the open position illustrated in at least FIGS. 6 and 7.

In one non-limiting embodiment, the arm 49 is formed from a plastic or other equivalent easily molded material or equivalents thereof that is integrally molded with the hold open lever 30 for example at the same time the hold open lever is formed. Alternatively, the arm 49 may be inserted molded into the hold open lever or still in another alternative fixed to the hold open lever separately. Although exemplary embodiments are directed to a plastic hold open lever and arm other equivalent materials are considered to be with the scope of various embodiments of the invention. As such, the arm 49 is formed out of a material having resilient characteristics such that a biasing force in the direction of arrow 45 is provided.

Once the fork bolt is in the position of FIG. 6, further movement of the fork bolt towards the open position causes feature or pin 43 to push against a cam surface 52 of the hold open lever 30, causing the hold open lever 30 to rotate about living hinge portion 35. This movement lifts stop portion 33 out of engagement with hook 41, allowing detent lever to bias back towards the engaged position of FIG. 2 where shoulder portion 23 can now engage with shoulder portion 24 of fork bolt 11.

As illustrated, the hold open arm portion of the housing arm has cam surfaces 52 such that movement of the fork bolt from a first or closed position to a second or open position will cause feature, pin or finger 43 to engage cam surface 52 and cause the housing arm to move upward in the direction of arrow 45, which in turn will allow the detent lever to move counter clockwise since feature or hook 41 is free to pass stop portion or feature 33 when the housing arm is moved upward. In addition and as an alternative embodiment, cam surface 52 is also configured such that movement of the fork bolt form an open position to a closed position (counter clockwise) will also cause the housing arm to move upward and allow the movement of the detent lever in a counter clockwise manner.

In addition, and as the fork bolt travels from the open position (see at least FIG. 8) towards the closed position feature 43 will now ride or slide on an outside surface 59 of integral arm 49. As mentioned above and since arm 49 is integrally formed with hold open lever 30 it is naturally biased back into the closed position in the direction of arrow 45 once the pin moves past a distal end 55 of the arm 49. Here feature 43 will contact surface 59 and push the hold open lever 30 further upward in the direction of arrow 45 such that a microswitch switch 70 or a plunger of a microswitch or switch is contacted and depressed by movement of the fork bolt from the position of FIG. 8 to FIG. 9, FIG. 10 and once it reaches FIG. 11 the hold open lever moves in a direction opposite to arrow 45 and the state of the microswitch 70 changes. In an exemplary embodiment, the microswitch is coupled to a microcontroller or controller wherein the state or signal of the switch is monitored and used by the microcontroller.

For example and as illustrated in the attached FIGS., The state of microswitch 70 is 0 when the latch is in the position illustrated in FIG. 2. Thereafter and as the detent lever 12 is moved into the disengaged position (FIG. 3) movement of the hold open lever 30 upward causes a portion of the hold open lever to contact microswitch 70 and change the state from 0 to 1. As illustrated, the state of the microswitch 70 remains at 1 as the latch assembly and its components cycle through the positions illustrated in FIGS. 4-10. Then once the fork bolt 11 and feature 43 move from the open position back into the latched position feature 43 no longer pushes the hold open lever upward via outside surface 59 and the hold open lever 30 moves in a direction opposite of arrow 45 towards the position illustrated in FIGS. 2 and 11. As such, feature 43 no longer pushes against surface 59 and the hold open lever is no longer pushing against microswitch 70 such that the state of the switch can change from 0 to 1. In other words, the state of the single switch is changed from 0 to 1 by movement of the detent lever from the engaged position to the disengaged position such that the hold open lever 30 will be pushed upward into contact with the microswitch 70. The state of the microswitch will remain at 1 until the fork bolt is rotated from the latched position to the unlatched position and then as the fork bolt rotates from the unlatched position back into the latched position feature or pin 43 will contact the outside surface 59 of arm 49 and push the hold open lever 30 upward such that the hold open lever 30 contacts the microswitch 70 and changes the state of the microswitch from 1 to 0.

Accordingly, a single switch can be used to determine the state of the fork bolt and the detent lever thus reducing the number of components used in the latch assembly.

Figure 12:
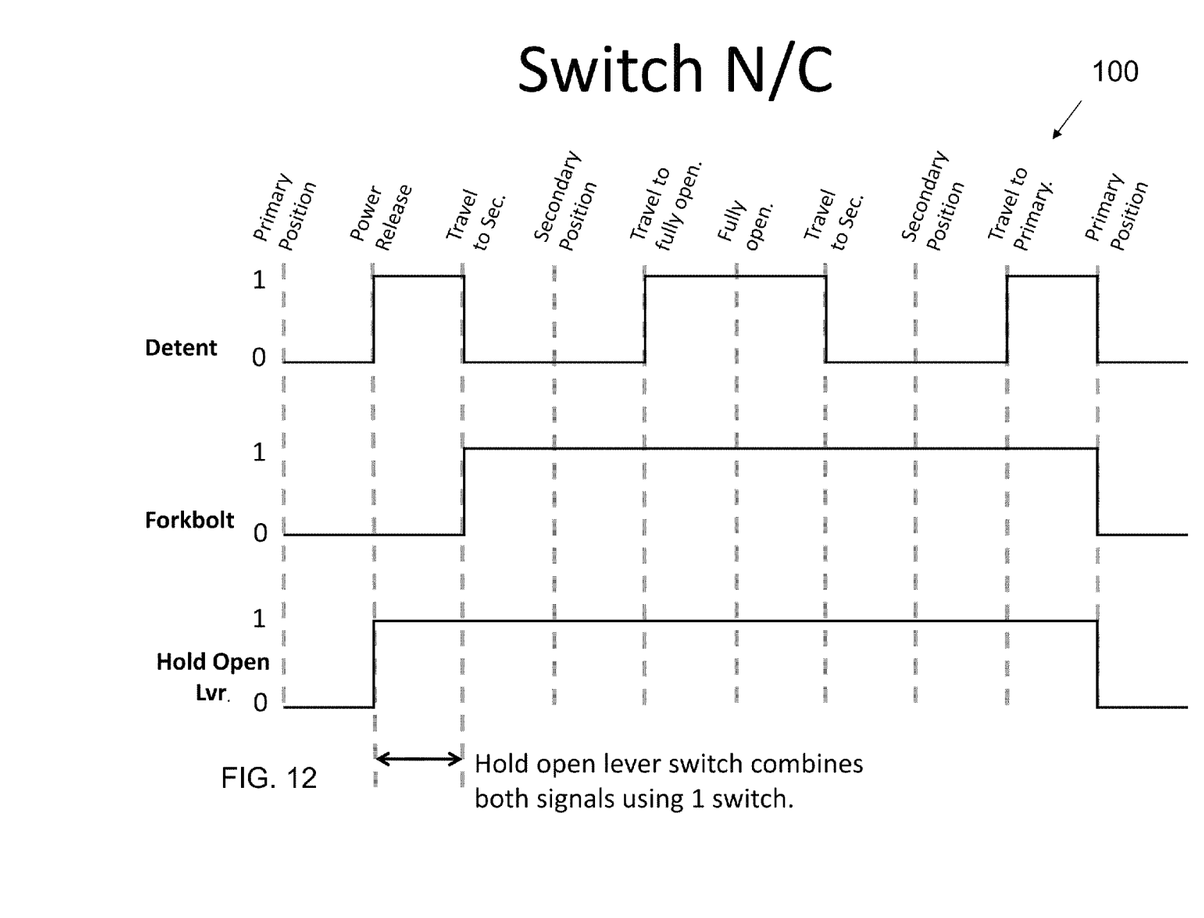
FIG. 12 is a graph illustrating the state of a single microswitch with respect to movement of the detent lever and the fork bolt lever.

For example and referring now to the graph 100 illustrated in FIG. 12 the state of the hold open lever switch or microswitch 70 is illustrated in combination with the state or position of both the detent lever and the fork bolt.

If a separate switch is used for both the fork bolt position and the detent lever position, if the fork bolt has an ajar switch it will not sense the detent position and if a switch is placed on the detent this switch will not sense the fork bolt position. If separate switches are used for the fork bolt and the detent lever the material cost will increase.

Accordingly by using a unique hold open lever with a feature on the fork bolt and a single switch, the switch be activated when the detent lever is power released regardless of the fork bolt position (i.e., when the latch is power released but the latch remains in primary position the switch will give the open signal of the detent). This switch signal will break when the latch or fork bolt is pushed back into primary position.

Accordingly and through the use of this design, only one switch is required to sense the interaction of the fork bolt and detent lever. The switch signal will break when the fork bolt reaches the primary position. Accordingly and in this configuration and when the latch is moving from primary to open the switch will tell the position of the detent lever. When the latch or fork bolt transitions from the open position to the latched position, the switch senses the position of the fork bolt.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A latch comprising:
   a fork bolt that moves between an unlatched position and a latched position;
   a first detent lever that that cooperates with the fork bolt and moves between an engaged position and a disengaged position;
   a hold open lever configured for movement between a blocking position and an unblocking position, wherein the hold open lever maintains the first detent lever in the disengaged position when the hold open lever is in the blocking position and wherein the hold open lever is configured to allow the first detent lever to move into the engaged position when the hold open lever is in the unblocking position; and
   a single switch that is activated only by contact with the hold open lever when the first detent lever is moved from the engaged position towards the disengaged position and when the fork bolt moves from the unlatched position towards the latched position, wherein the latch does not have any other switches.

2. The latch of claim 1, wherein the hold open lever is integrally formed with a cover portion wherein at least a portion of the hold open lever is plastic and the hold open lever is coupled to the cover portion with a living hinge.

3. The latch of claim 1, wherein the hold open lever includes a stop portion and the first detent lever includes a feature for engaging the stop portion.

4. The latch of claim 1, wherein the first detent lever and the fork bolt occupy a first plane and the hold open lever occupies a second plane.

5. The latch of claim 4, wherein the hold open lever has a stop portion extending therefrom and the first detent lever has a feature extending therefrom for engaging the stop portion.

6. The latch of claim 1, wherein the hold open lever further comprises an integrally formed arm that is actuated by a feature of the fork bolt as the fork bolt moves from the latched position to the unlatched position.

7. The latch of claim 1, wherein the hold open lever further comprises an integrally formed arm that is actuated by a feature of the fork bolt that slides along an inside surface of the integrally formed arm as the fork bolt moves from the latched position to the unlatched position.

8. The latch of claim 7, wherein the feature of the fork bolt contacts an exterior surface of the integrally formed arm as the fork bolt moves from the unlatched position to the latched position and wherein the feature causes the hold open lever to move upwards towards the single switch as the fork bolt is moved to the latched position and wherein the single switch is a microswitch.

9. A latch, comprising:
   a fork bolt that moves between an unlatched position and a latched position;
   a first detent lever that that cooperates with the fork bolt and moves between an engaged position and a disengaged position, wherein the first detent lever prevents the fork bolt from moving from the latched position to the unlatched position when the first detent lever is in the engaged position;
   a hold open lever configured for movement between a blocking position and an unblocking position, wherein the hold open lever maintains the first detent lever in the disengaged position when the hold open lever is in the blocking position and wherein the hold open lever is configured to allow the first detent lever to move into the engaged position when the hold open lever is in the unblocking position and wherein the hold open lever is configured to allow a feature of the fork bolt to pass through the hold open lever as the fork bolt moves from the latched position to the unlatched position and wherein the feature of the fork bolt contacts and moves the hold lever from the blocking position to the unblocking position as the fork bolt moves from the unlatched position to the latched position; and
   a single switch that is only activated by contact with the hold open lever as it moves between the blocking position and the unblocking position.

10. The latch as in claim 9, wherein the hold open lever is integrally formed with a cover portion of the latch and wherein at least a portion of the hold open lever is plastic and the hold open lever is coupled to the cover portion with a living hinge.

11. The latch as in claim 10, wherein the hold open lever is biased into the blocking position.

12. The latch as in claim 9, wherein the hold open lever includes a stop portion and the first detent lever includes a feature for engaging the stop portion.

13. The latch as in claim 9, wherein the first detent lever and the fork bolt occupy a first plane and the hold open lever occupies a second plane.

14. The latch as in claim 9, wherein the hold open lever further comprises an integrally formed arm that moves between a first position and a second position as the fork bolt moves from the latched position to the unlatched position and wherein the hold open lever remains in the blocking position as the integrally formed arm moves from the first position to the second position.

15. The latch of claim 14, wherein the integrally formed arm of the hold open lever is moved from the first position to the second position by a feature of the fork bolt that slides along an inside surface of the integrally formed arm as the fork bolt moves from the latched position to the unlatched position.

16. The latch as in claim 15, wherein the feature of the fork bolt contacts an exterior surface of the integrally formed arm as the fork bolt moves from the unlatched position to the latched position and wherein the feature causes the hold open lever to move from the blocking position to the unblocking position as the fork bolt is moved to the latched position.

17. The latch as in claim 15, wherein the single switch is a microswitch that is actuated as the hold open lever is moved from the blocking position to the unblocking position.

18. A method of determining a state of a latch, comprising:
movably mounting a fork bolt to the latch for movement between an unlatched position and a latched position;
movably mounting a first detent lever to the latch for movement between an engaged position and a disengaged position, wherein the first detent lever prevents the fork bolt from moving from the latched position to the unlatched position when the first detent lever is in the engaged position;
movably mounting a hold open lever to the latch for movement between a blocking position and an unblocking position, wherein the hold open lever maintains the first detent lever in the disengaged position when the hold open lever is in the blocking position and wherein the hold open lever is configured to allow the first detent lever to move into the engaged position when the hold open lever is in the unblocking position and wherein the hold open lever is configured to allow a feature of the fork bolt to pass through the hold open lever as the fork bolt moves from the latched position to the unlatched position and wherein the feature of the fork bolt contacts and moves the hold open lever from the blocking position to the unblocking position as the fork bolt moves from the unlatched position to the latched position; and
actuating only a single switch by contact with the hold open lever as it moves between the blocking position and the unblocking position.

19. The method as in claim 18, wherein the hold open lever is integrally formed with a cover portion of the latch and wherein at least a portion of the hold open lever is plastic and the hold open lever is coupled to the cover portion with a living hinge and the hold open lever is biased into the blocking position.

20. The method as in claim 18, wherein the hold open lever further comprises an integrally formed arm that moves between a first position and a second position as the fork bolt moves from the latched position to the unlatched position and wherein the hold open lever remains in the blocking position as the integrally formed arm moves from the first position to the second position and wherein the integrally formed arm of the hold open lever is moved from the first position to the second position by a feature of the fork bolt that slides along an inside surface of the integrally formed arm as the fork bolt moves from the latched position to the unlatched position and wherein the feature of the fork bolt contacts an exterior surface of the integrally formed arm as the fork bolt moves from the unlatched position to the latched position and wherein the feature causes the hold open lever to move from the blocking position to the unblocking position as the fork bolt is moved to the latched position.

\* \* \* \* \*